United States Patent [19]

Peng et al.

[11] 4,322,508
[45] Mar. 30, 1982

[54] HIGH SOLIDS PAINT COMPOSITION COMPRISING HYDROXY FUNCTIONAL OLIGOESTERS AND HYDROXY FUNCTIONAL COPOLYMERS

[75] Inventors: Stephen C. Peng, Utica; David M. Thomson, Mt. Clemens, both of Mich.

[73] Assignee: Ford Motor Company, Dearborn, Mich.

[21] Appl. No.: 157,705

[22] Filed: Jun. 9, 1980

Related U.S. Application Data

[63] Continuation-in-part of Ser. No. 41,207, May 21, 1979, abandoned, and a continuation-in-part of Ser. No. 852, Jan. 4, 1979, abandoned, which is a continuation-in-part of Ser. No. 888,064, Mar. 20, 1978, abandoned.

[51] Int. Cl.³ .................................. C08G 12/30
[52] U.S. Cl. .................... 525/110; 427/386; 427/388.1; 427/388.3; 427/388.5; 525/111; 525/113; 525/118; 525/128; 525/131; 525/158; 525/162; 528/60; 528/80; 528/81; 528/254; 528/261
[58] Field of Search .............. 525/110, 111, 113, 118, 525/128, 131, 158, 162, 176, 404, 408, 440, 528; 528/44, 60, 81, 80, 254, 261

[56] References Cited

U.S. PATENT DOCUMENTS

| | | | |
|---|---|---|---|
| 2,456,408 | 12/1948 | Greenlee | 260/18 EP |
| 2,653,141 | 9/1953 | Greenlee | 260/18 EP |
| 2,681,897 | 6/1954 | Frazier et al. | 525/162 |
| 2,812,337 | 11/1957 | Culemeyer | 260/404 |
| 3,082,184 | 3/1963 | Falgiatore et al. | 525/162 |
| 3,098,835 | 7/1963 | Gaylord | 525/162 X |
| 3,198,850 | 8/1965 | Levantin | 525/110 |
| 3,373,221 | 3/1968 | May | 260/18 EP X |
| 3,404,018 | 10/1968 | Hicks | 525/514 |
| 3,412,055 | 11/1968 | Koral | 525/162 X |
| 3,433,771 | 3/1969 | Vasta | 260/18 EP X |
| 3,494,605 | 2/1970 | Rehfuss | 525/162 X |
| 3,660,145 | 5/1972 | Johnson et al. | 428/417 |
| 3,664,861 | 5/1972 | O'Kamura | 427/36 |
| 3,836,492 | 9/1974 | Watanabe et al. | 260/23 TN |
| 3,847,874 | 11/1974 | Murakami et al. | 260/18 EP X |
| 3,856,883 | 12/1974 | Dickie et al. | 525/162 |
| 3,928,420 | 12/1975 | Fang | 560/90 |
| 3,969,300 | 7/1976 | Nagata et al. | 427/386 X |
| 3,991,003 | 11/1975 | Piggolt | 260/18 EP |
| 4,075,141 | 2/1978 | Porter, Jr. et al. | 260/17 A |
| 4,137,389 | 1/1979 | Wingler et al. | 525/162 X |
| 4,163,029 | 7/1979 | Smith et al. | 528/254 X |
| 4,169,825 | 10/1979 | Yapp et al. | 260/31.6 |
| 4,196,270 | 4/1980 | Chatta | 525/110 |

FOREIGN PATENT DOCUMENTS

| | | | |
|---|---|---|---|
| 2505829 | 2/1976 | Fed. Rep. of Germany | 525/162 |
| 47-17626 | 5/1972 | Japan | 525/162 |

*Primary Examiner*—Norman Morgenstern
*Assistant Examiner*—Thurman K. Page
*Attorney, Agent, or Firm*—Roger L. May; Keith L. Zerschling

[57] ABSTRACT

A high solids, thermosetting coating composition which, exclusive of pigments, solvents and other nonreactive components consists essentially of:

(A) A hydroxy functional component consisting of:
(1) between about 1 and about 90 weight percent of an oligoester (i) having a number average molecular weight ($\overline{M}_n$) of between about 150 and about 3000 (ii) bearing at least about 2 hydroxyl groups and (iii) being formed by an esterification reaction between a carboxylic acid and an epoxide; and
(2) between about 99 and about 10 weight percent of a hydroxy functional copolymer having a number average molecular weight ($\overline{M}_n$) of between about 500 and about 15,000, said hydroxy functional copolymer being formed from about 10 to about 50 weight percent of hydroxy functional monoethylenically unsaturated monomers selected from the group consisting of hydroxy bearing aliphatic alcohol esters of acrylic and methacrylic acids, and a remainder of other monoethylenically unsaturated monomers; and
(B) A crosslinking agent capable of reacting with hydroxy functionality of said hydroxy functional component.

43 Claims, No Drawings

HIGH SOLIDS PAINT COMPOSITION COMPRISING HYDROXY FUNCTIONAL OLIGOESTERS AND HYDROXY FUNCTIONAL COPOLYMERS

This application is a continuation-in-part of U.S. Ser. No. 041,207 filed May 21, 1979 now abandoned, U.S. Ser. No. 000,852 filed Jan. 4, 1979 now abandoned, which, in turn, is a continuation-in-part of U.S. Ser. No. 888,064 filed Mar. 20, 1978 and now abandoned.

BACKGROUND OF THE INVENTION

The invention described herein relates to a thermosetting, high solids, coating composition. More particularly, the invention relates to a polymeric, high solids coating, composition adapted to provide an automotive topcoat which demonstrates hardness, high gloss, outstanding durability and excellent resistance to solvents and water.

Because of the increasingly strict solvent emissions regulations in recent years, low solvent emission paints have become very desirable. A number of high solids paint compositions have been proposed to meet these low solvent emission requirements; however, many of these compositions are deficient because of difficulty of application, slow curing rates, lack of flexibility, poor durability and low solvent and water resistance. Many of the proposed compositions hae been particularly deficient as automotive topcoats.

The coating compositions of this invention combine the above discussed desired properties and low application viscosity with rapid cure so as to overcome deficiencies of previously proposed high solids materials and thereby achieve a high solids coating composition particularly adapted for automotive topcoats.

SUMMARY OF THE INVENTION

The high solids, thermosetting coating composition of this invention is capable of curing rapidly at a relatively low temperature. The composition, which preferably contains greater than about 50%, and most preferably greater than 70% by weight, nonvolatile solids, exclusive of pigments, solvents and other nonreactive components, consists essentially of:

(A) A hydroxy functional component consisting of:
  (1) between about 1 and about 90 weight percent of one or more oligoesters (i) having a number average molecular weight ($M_n$) of between about 150 and about 3000, (ii) bearing at least about 2 hydorxyl groups per molecule, and (iii) being formed by an esterification reaction between a carboxylic acid and an epoxide; and
  (2) between about 99 and about 10 weight percent of a hydroxy functional copolymer having a number average molecular weight ($M_n$) of between about 500 and about 15,000, said hydroxy functional copolymer being formed from about 10 to about 50 weight percent of hydroxy functional monoethylenically unsaturated monomers selected from the group consisting of hydroxy bearing aliphatic alcohol esters of acrylic and methacrylic acids, and a remainder of other monoethylenically unsaturated monomers; and (B) A crosslinking agent capable of reacting with hydroxyl functionality of said hydroxy functional component. In addition, the high solids coating composition of the invention may include additives, catalysts, antioxidants, U.V. absorbers, flow control or wetting agents, antistatic agents, pigments, plasticizers, solvents, etc.

DETAILED DESCRIPTION OF THE INVENTION

The high solids, thermosetting coating compositions of this invention overcome disadvantages of prior art high solids compositions, to provide a system which is particularly suitable for applications requiring high gloss, hardness, durability, and high solvent and water resistance as well as a fast cure rate at relatively low temperatures, e.g., between about 20° C. and about 180° C., preferably between about 75° C. and about 160° C.

Each of the components of the high solids coating compositions of the invention, the amounts of each of the components required to achieve the desired results of the invention and methods for applying the composition are described hereinafter in greater detail.

Hydroxy Functional Component

As discussed above, one of the major components of the high solids coating composition of the invention is a hydroxy functional component consisting of (1) a particular hydroxy functional oligoester and (2) a particular hydroxy functional copolymer.

Hydroxy Functional Oligoester

The hydroxy functional oligoester is present in the hydroxy functiona component of the composition of the invention in an amount ranging from about 1 to about 90 weight percent, preferably from about 5 to about 50 weight percent. Most preferably, the oligoester is present in the amount of about 30 weight percent. The hydroxy functional oligoesters useful in compositions of the invention (i) have a number average molecular weight ($M_n$) of between about 150 and 3000, preferably between about 230 and about 1000, (ii) bear at least about 2 hydroxyl groups per molecule, and (iii) are formed by an esterification reaction between a carboxylic acid and an epoxide.

Exemplary of the hydroxy functional oligoesters useful in compositions of the invention are:
 (a) the esterification reaction product of polycarboxylic acid, i.e., carboxylic acid bearing 2 or more carboxyl groups, and monoepoxide;
 (b) the esterification reaction product of a polyepoxide, i.e., a compound having 2 or more epoxide groups, and monocarboxylic acid preferrably monocarboxylic acid containing no ethylenic unsaturation and bearing no hydroxy functionality;
 (c) the esterification reaction product of hydroxy functional carboxylic acid and mono- or polyepoxide preferrably monoepoxide;
 (d) the esterification reaction product of monocarboxylic acid and hydroxy functional mono- or polyepoxide preferrably monoepoxide; and
 (e) mixtures of (a)–(d).

The first type of hydroxy functional oligoester noted above is preferably prepared by reacting approximately 1 to 1 equivalent quantities of a polycarboxylic acid with an alkylene oxide in the presence of an esterification catalyst. A small excess of the alkylene oxide is desirable, but not necessary. Among the preferred carboxylic acids for preparing this type of oligoester are aliphatic and aromatic acids including succinic acid, glutaric acid, adipic acid, pimelic acid, suberic acid, azelaic acid, sebacic acid, dodecane dicarboxylic acid, dimer fatty acid, trimer fatty acid, phthalic acid, isophthalic acid, terephthalic acid, and hexahydrophthalic acid. Still other useful acids are various carboxy bearing polymers including carboxy terminated polyesters, carboxy termined polybutadienes, and the like. Such materials will be apparent to those skilled in the art. Although numerous acids may be employed to make this type of oligoester, dicarboxylic acids containing 6 to 12 carbons are most preferred. Of course, mixtures of the various di- or polycarboxylic acids may also be employed.

Monoepoxides useful in preparing this first type of oligoester are epoxides which contain a three-membered epoxide group. Preferred epoxides are alkylene oxides of two to three carbon atoms, such as ethylene oxide and propylene oxide. Among the many other useful epoxides which will be apparent to those skilled in the art are 1,2 butylene oxide, 2,3-butylene oxide, 1,2 hexylene oxide, 1,2-epoxydecane, 1,2-epoxydodecane, cyclopentene oxide, styrene oxide, butyl glycidyl ether, epichlorohydrin, etc. Of course, mixtures of monoepoxides may also be used.

The second type of hydroxy functional oligoester noted above may be prepared by reacting one or more polyepoxides with one or more monocarboxylic acids, preferably in an approximate equivalent ratio. Useful polyepoxides contain at least two epoxy groups with the diepoxides being most preferred. Among the preferred diepoxides useful in the preparation of such an oligoester are diglycidyl ether of bisphenol A and butyl diglycidyl ether. Monocarboxylic acids useful may be selected from aliphatic, cycloaliphatic, and aromatic carobxylic acids and mixtures thereof, with those containing no ethylenic unsaturation and bearing no hydroxy functionality being most preferred. Exemplary of the many acids which may be employed are benzoic acid, t-butyl benzoic acid and acetic acid. Preparation of oligoesters from monocarboxylic acids and polyepoxides is well known in the art and is further described, for example, in U.S. Pat. Nos. 2,456,408 and 2,653,141.

Preparation of hydroxy functional oligoester by the esterification reaction of hydroxy functional monocarboxylic acid with an epoxide is described in U.S. Pat. No. 3,404,018, the teachings of which are hereby incorporated by reference. The epoxides employed in accordance with the teachings of that patent are polyepoxides, while preferred oligoesters of this invention are prepared by employing a monoepoxide, such as an alkylene oxide, and a hydroxy functional monocarboxylic acid. Numerous monoepoxide materials suitable for this purpose will be apparent to those skilled in the art.

It will be appreciated that various combinations of carboxylic acids and epoxides within the scope of the claimed invention other than those specifically discussed above may be reacted in order to provide oligoesters useful in the high solids compositions of the invention. For example, oligoesters bearing hydroxy functionality other than that produced by the esterification reaction may be produced by reacting not just a hydroxy bearing carboxylic acid with an epoxide as discussed above, but by reacting carboxylic acids and epoxides, either of which bears hydroxyl functionality. Examples of such oligoesters are (i) trihydroxy oligoesters prepared by reacting a monocarboxylic acid with a monohydroxy diepoxide such as hydroxy glycidyl ethers of bisphenol A and aliphatic hydroxy glycidyl resins, (ii) trihydroxy oligoesters prepared by reacting a monohydroxy monocarboxylic acid such as 3-hydroxybutric acid, 4-hydroxycyclohexyl carboxylic acid or 4-methylol benzoic acid with a monohydroxy monoepoxide such as glycidol and 1,4-butanediolmonoglycidyl ether; or (iii) trihydroxy oligoesters prepared by reacting a monocarboxylic acid with a dihydroxy monoepoxide such as acetic acid with 2,3-epoxy-1,4-butane diol.

It will be appreciated by those skilled in the art that all of the above are merely exemplary of the various oligoesters falling within the scope of those useful in compositions of the invention.

Noninterfering functionality present in the carboxylic acid or epoxide molecule employed in preparing any of the above hydroxy functional oligoesters may yield certain specific coating properties which may be desirable. Such functionalities and their effects which will be apparent to those skilled in the art may include, for example, a halogen, an ester linkage, etc. More specifically, for example, an oligoester prepared by reaction of chlorendic acid and propylene oxide when formulated with a polyisocyanate in accordance with the invention yields a polyurethane coating which exhibits fire retardant properties.

Preferred esterification catalysts useful in preparation of hydroxy functional oligoesteres by the esterification reactions discussed above are the tetralkyl ammonium salts such as tetra methyl ammonium chloride, tetraethyl ammonium bromide and trimethyl benzyl ammonium chloride as well as metal salts of a carboxylic acid such as potassium octoate or chromium III octoate. Other useful esterification catalysts include: metal halides such as chromium trichloride, ferric trichloride, and aluminum trichloride; mercaptans and thioethers such as octyl mercaptan, dimercapto propanol and dimercapto-diethyl ether; tertiary amines such as triethyl amine, pyridine, dimethylandine, quinoline, B-picoline, ethylpyridine; and the like. Still other catalysts known to catalyze carboxy/epoxy reactions will be apparent to those skilled in this art.

In all cases, the oligoesters formed are low molecular weight adducts having a narrow molecular weight distribution when compared to similar compositions made by normal polyester manufacturing techniques.

Various mixtures of these types of oligoesters may also be employed within the scope of the compositions of the invention described herein.

Hydroxy Functional Copolymer

The other hydroxy functional material present in the hydroxy functional component of the compositions of the invention is a hydroxy functional copolymer which is present in an amount ranging from about 99 to about 10 weight percent, preferably from about 95 to about 50 weight percent, of the hydroxy functional component. Most preferably the copolymer is present in the amount of about 70 weight percent of the hydroxy functional component.

The hydroxy functional copolymers useful in the invention may be prepared by conventional free radical induced polymerization of suitable unsaturated monomers. The term "copolymer" as used herein means a polymer of two or more different monomers.

The copolymers used in the compositions of the invention contain between about 10 and about 50, preferably between about 25 and about 40, weight percent of a hydroxy bearing monomer. These monomers provide the copolymer with its hydroxy functionality and are preferably selected from hydroxyalkyl esters of monotheylenically unsaturated carboxylic acids. Among the numerous hydroxy functional monomers which may be employed are: 2-hydroxyethyl acrylate; 3-chloro-2-hydroxypropyl acrylate; 2-hydroxy-1-mehtylethyl acrylate; 2-hydroxypropyl acrylate; 3-hydroxyproply acrylate; 2,3 dihydroxypropyl acrylate; 2-hydroxybutyl acrylate; 4-hydroxybutyl acrylate; dethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3 dihydroxypropyl 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

The remainder of the monomers forming the hydroxy functional copolymer, i.e., between about 90 and about 50 weight percent, preferably between about 75 and about 60 weight percent, are other monoethylenically unsaturated monomers. The monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the other alpha-beta olefinically unsaturated monomers which may be employed are acrylates (meaning esters of both acrylic and methacrylic acids) as well as mixtures of acrylates and vinyl hydrocarbons. Preferably, in excess of 30 weight percent of the total copolymer monomers are esters of a $C_1$-$C_8$ monohydric alcohol and acrylic or methacrylic acid, e.g., methyl methacrylate, ethyl acrylate, butyl acrylate, butyl methacrylate, hexyl acrylate, 2-ethylhexylacrylate, lauryl methacrylate, etc. Among the monovinyl hydrocarbons suitable for use in forming the copolymer are those containing 8 to 12 carbon atoms and including styrene, alpha methyl styrene, vinyl toluene, t-butyl styrene and chlorostyrene. When such monovinyl hydrocarbons are employed, they should constitute less than 50 weight percent of the copolymer. Other vinyl monomers such as vinyl chloride, acrylonitrile, methacrylonitrile, vinyl acetate, acrylic acid or methacrylic acid may be included in the copolymer as modifying monomers. However, when employed these modifying monomers should constitute only between about 0 and about 40 weight percent of the monomers in the copolymer.

The hydroxy functional copolymers used in the coating compositions of the invention have a number average molecular weight ($\overline{M}_n$) in the range of between about 500 and about 15,000, preferably between about 1500 and about 5000.

In preparing the copolymer, the hydroxy functional monomer and the remaining monoethylenically unsaturated monomers are mixed and reacted by conventional free radical initiated polymerization in such proportions as to obtain the copolymers desired. A large number of free radical initiators are known to the art and are suitable for this purpose. These include: benzoyl peroxide; lauryl peroxide; t-butylhydroxy peroxide; acetylcyclohexane sulfonyl peroxide; diisobutyryl peroxide; di-(2-ethyl hexyl) peroxydicarbonate; diisopropyl peroxydicarbonate; t-butylperoxypivalate; decanoyl peroxide; azobis (2-methyl-propionitrile); t-butyl perbenzoate; t-butylperoctoate; cumene hydroperoxide; etc. Polymerization is preferably carried out in solution using a solvent in which the hydroxy functional copolymer is soluble. Included among these solvents are toluene, xylene, dioxane, butanone, mehthylamyl ketone, cellosolve acetate, etc.

Crosslinking Agent

The other major component of the compositions of the invention is a crosslinking agent capable of reacting with the hydroxyl groups of the hydroxy functional component to effect a cure of the composition. While it will be appreciated that the particular crosslinking agent is not critical to the invention and that many suitable materials may be selected, preferred crosslinking agents are isocyanates and well known amino compounds.

Isocyanates useful as crosslinking agents in the thermosetting, high solids coating compositions of the invention are polyisocyanates, i.e., compounds having 2 or more, preferably 3 or more, reactive isocyanate groups per molecule. These polyisocyanate crosslinking agents are included in the compositions of the invention in an amount sufficient to provide between about 0.5 and about 1.6, preferably between about 0.8 and about 1.3, reactive isocyanate groups per hydroxy group in the composition. Most preferably the isocyanate crosslinking agent is included in an amount sufficient to provide about 1.1 isocyanate groups per hydroxyl group in the composition.

Polyisocyanates are will known in the art and numerous suitable isocyanates having 2 or more reactive isocyanate groups per molecule will be apparent to those skilled in the art. Among the many suitable polyisocyanates are aliphatic, cycloaliphatic and aromatic isocyanate compounds. Representative of the numerous isocyanates which may be employed are (1) aliphatic diisocyanates such as trimethylene diisocyanate, tetramethylene diisocyanate, pentamethylene diisocyanate, hexamethylene diisocyanate, 1,2 propylene diisocyanate, 1,2 butylene diisocyanate, 2,3 butylene diisocyanate, 1,3 butylene diisocyanate, ethyldiene diisocyanate, butyldiene diisocyanate, 4,4'bis (isocyanate hexyl) methane, bis (2-isocyanate-ethyl) fumarate, 2,6-diisocyanate methyl caproate, 2,2,4 (2,4,4)-trimethylhexamethylene diisocyanate, and dimer acid diisocyanates; (2) cycloaliphatic diisocyanates such as 1,3 cyclopentane diisocyanate, 1,4 cyclopentane diisocyanate, 1,2 cyclopentane diisocyanate, and methylcyclohexylene diisocyanate; (3) aromatic diisocyanates such as m-phenylene diisocyanate, p-phenylene diisocyanate, 4,4' diphenyl diisocyanate, 1,5-methylene diisocyanate, 1,4 naphthalene diisocyanate; (4) aliphatic/aromatic diisocyanates such as 4,4' diphenylenemethane diisocyanates, 2,4 or 2,6 tolylene diisocyanate, 4,4' toluidene diisocyanate, 1,4 xylene diisocyanate; (5) nuclear substitute aromatic compounds such as dianisidine diisocyanate, 4,4' diphenylether diisocyanate, chlorodiphenylene diisocyanate; (6) triisocyanates such as triphenylmethane 4,4', 4,4" triisocyanate, 1,3,5 triisocyanate benzene, 2,4,6 triisocyanate toluene; (7) tetraisocyanates such as 4,4' diphenyl dimethylmethane 2,2', 5,5' tetraisocyanates; (8) polymerized isocyanates such as tolylene diisocyanate dimers and trimers and the like; and (9) polyisocyanates such as prepolymers derived from a polyol, including polyether polyols or polyester polyols (including polyethers which are reacted with excess polyisocyanates to form isocyanate terminated prepolymers), simple polyols such as glycols (e.g., ethylene glycol, propylene glycol), other polyols such as glycerol, trimethylol propane, hexane triol, pentaerythritol and the like, as well as monoethers, e.g., diethylene glycol, tripropylene glycol and the like and polyethers, i.e., alkylene oxide condensates of the above.

Especially preferred to use in the compositions of the invention are trimerized products of aliphatic diisocyanates such as 1,6 hexamethylene diisocyanate. Still another particularly preferred type of crosslinking agent is a polyisocyanate having a biuret structure. This type of polyisocyanate is well known as are methods for making the same. One such polyisocyanate crosslinking agent is a high molecular weight biuret of 1,6 hexamethylene diisocyanate sold by Mobay Chemical Company under the tradename Desmodur N. Exemplary of other biuret type polyisocyanates are those prepared in accordance with U.S. Pat. No. 3,976,622 to Wagner et al.

The amino crosslinking agents useful in the high solids coating compositions of the invention are preferably condensation products of formaldehyde with melamine, substituted melamines, urea or substituted and unsubstituted benzoguanamine. Such multifunctional amino compounds, which are widely used in the coating industry, may be used in monomeric, polymeric or a mixture of monomeric and polymeric forms. These amino crosslinking agents are present in the high solids, thermosetting coating compositions in an amount equal to the total of (a) between about 40 and about 150 parts by weight per 100 parts by weight of said oligoesters and (b) between about 25 and about 67 parts be weight per 100 parts by weight of said hydroxy functional copolymer. The crosslinking reaction occurring during cure of the compositions of the invention is between the reactive amino groups of the crosslinking agent and the hydroxyl groups of the hydroxy functional component.

Among the various monomeric melamine formaldehyde crosslinkers which may be used are hexamethoxymethyl melamine, trimethoxymethyl trimethylol melamine, tributoxy methyltrimethoxymethyl melamine, tributoxy methyltrimethylol melamine, trimethoxy methylmelamine and tributoxymethyl melamine. Exemplary of the various polymeric melamine formaldehyde crosslinking agents useful in the compositions of the invention are methylated melamine-formaldehyde resins, butylated melamine-formaldehyde resins, and butylated melamine-formaldehyde resins or mixtures of methylated and butylated melamine resins.

Particularly preferred amino resins for use in the compositions of the invention are ethers of fully methylated melamine. Examples of these are hexamethoxymethyl melamine or other melamine/formaldehyde reaction products which have greater than five of the possible six reactive hydrogens on melamine reacted with formaldehyde and which are then etherified with $C_1$-$C_4$ alcohols.

Monomeric urea-formaldehyde crosslinking agents useful in the disclosed compositions include, but are not limited to, dimethoxymethyl urea; monomethoxymethyl urea; and dimethylolethylene urea. Polymeric urea-formaldehyde resin crosslinkers include methylated, butylated and isobutylated urea-formaldehyde resins.

Exemplary of the monomeric condensation reaction products of formaldehyde and benzoguanamine or substituted benzoguanamine are dimethoxymethyl benzoguanamine, dibutoxymethyl benzoguanamine, dimethylol benzoguanamine, dimethoxymethyl-2-methylbenzoguanamine, and tetramethoxymethyl-3-chlorobenzoguanamine. A suitable polymeric condensation product of this type is butylated benzoguanamine-formaldehyde resin.

A number of methods for preparing melamine formaldehyde resins, urea formaldehyde resins and benzoguanamine formaldehyde resins are well known in the art. The method chosen depends on the various properties, reactivity and rate of cure desired for the resin product. The means available for varying these properties include control of the formaldehyde to melamine or urea ratio, the type or quantity of alcohol reactant, variation in degree of alkoxylation, reaction medium and catalysts employed. For purposes of illustration, the methods for preparing hexamethoxymethyl melamine, butylated melamine formaldehyde resin, dimethoxymethyl urea and butylated urea formaldehyde resin are set forth below:

A. Preparation of Hexamethoxymethyl Melamine Resin 704 g. of a 55% solution of methyl formel and 0.2 g. of 8% in sodium hydroxide are charged to a reaction flask resulting in a pH of 9.3. The flask is heated to 80° C. and 252 g. of melamine added. The reaction mixture is then heated to reflux and refluxed for 30 minutes. The reactants are then cooled to 35° C. and 454 g. of methanol and sulfuric acid are charged to the vessel to give a pH of 1.0. The reaction temperature is maintained at 35°–39° C. for 1 hour. The heat is next removed and the solution neutralized with 50% sodium hydroxide. Hexamethoxymethyl melamine is obtained after filtration and stripping the solvent.

B. Preparation of Butylated Melamine Formaldehyde Resin 365 g. of a 37% aqueous solution of formaldehyde, sufficient sodium hydroxide to neutralize the formaldehyde to a pH of 8.5 and 126 g. of melamine are charged successively to a reaction vessel. The reaction mixture is heated to refluxing temperature in about 0.5 hours and refluxed for 1.5 to 2 hours. 613 g. of N-butanol is added together with 1.7 g. of 85% phosphoric acid. The butanol is introduced incrementally so as to maintain a clear solution and the solution is refluxed for an additional hour, after which the water and N-butanol are removed to give a solvent-free butylated melamine-formaldehyde resin.

C. Preparation of Dimethoxymethyl Urea Resin 10 g. of dimethylol urea is added to 100 ml. of methanol containing 1 drop of 5 N hydrochloric acid. Five minutes after solution occurs the solution is neutralized with silver carbonate. Following filtration and concentration, crystals of dimethoxymethyl urea are separated.

D. Preparation of Butylated Urea-Formaldehyde Resin 2430 g. of a 37% aqueous solution of formaldehyde is charged to a reaction vessel. Dilute potassium hydroxide is then added to bring the pH to 8 to 9. 600 g. of urea and 2000 g. of N-butanol are next added and the reaction mixture heated to 100° C. in ½ hour and refluxed for 1 hour. Phosphoric acid is then added to bring the pH to 5 to 6 and the solution is refluxed for another hour before the solvent is removed under vacuum.

Other Materials

In addition to the above discussed components, other materials may be included in the high solids coating compositions of the invention. These include conventional materials such as catalysts, antioxidants, U.V. absorbers, solvents, surface modifiers and wetting agents, as well as pigments. The solvents used in the coating compositions of the inventions are those which are commonly used. Typical solvents useful in the coating compositions facilitate spray application at high solids content and include toluene, xylene, methylethyl ketone, acetone, tetrahydrofuran, ethylacetate, dimethylsuccinate, dimethylglutarate, dimethyladipate, or mixtures thereof. As mentioned above, the nonvolatitle solids content of the high solids coating composition is at least 50% and preferably 70% or more, thus limiting the amount of solvent included in the composition.

Surface modifiers or wetting agents are common additives for liquid paint compositions. The exact mode of operation of these surface modifiers is not known, but it is thought that their presence contributes to better adhesion of the coating composition of the surface being coated and helps formation of thin coatings on surfaces, particularly metal surfaces. These surface modifiers are exemplified by acrylic polymers containing 0.1-10 percent weight of copolymerized monoethylenically unsaturated carboxylic acid esters such as methacrylic acid esters, acrylic acid esters or itaconic acid esters, cellulose acetate butyrate, silicon oils or mixtures thereof. Of course, the choice of surface modifiers or wetting agent is dependent upon the type of surface to be coated and selection of the same is clearly within the skill of the artisan.

A particularly useful additive for the high solids coating compositions is a flow-control additive which is prepared as described in Example D of U.S. Pat. No. 4,075,141 to Samuel Porter, Jr. et al dated Feb. 21, 1978. That flow control additive, which is actually a nonaqueous dispersion, is preferably employed in amounts ranging from about 5 to about 10 weight percent based on total resin solids, although greater or lesser amounts may be used.

The high solids coating composition of the invention also may include pigments. The amount of pigment in the composition may vary, but preferably is between about 3 and about 45 weight percent based on total solids weight of the composition.

Application Techniques

The high solids coating compositions of the invention can be applied by conventional methods known to those in the art. These include roller coating, spray coating, dipping or brushing and, of course, the particular application technique chosen will depend on the particular substrate to be coated, the environment in which the coating operation is to take place, and the pot life of the composition.

A particularly preferred technique for applying the high solids coating compositions, particularly when applying the same to automobiles as topcoats, is spray coating through the nozzle of a spray gun. In accordance with this preferred technique, the hydroxy functional oligoester and the hydroxy functional copolymer along with other additives such as pigments, U.V. absorbers, antioxidants and other nonreactive materials are admixed with a solvent. These materials are fed as one component of a two component system into spray gun which combines the materials as they are sprayed onto the automotive substrate. The other material is the isocyanate or amino crosslinking agent, which may or may not be cut with a suitable solvent.

The invention will be further understood by referring to the following detailed examples. It should be understood that the specific examples are presented by way of illustration and not by way of limitation. Unless otherwise specified, all references to "parts" is intended to mean parts by weight.

EXAMPLE I (A) Preparation of Hydroxy Functional Oligoester

A reaction flask equipped with a stirrer, water condenser, thermometer, nitrogen inlet and a monomer addition funnel is charged with 188 grams (1.0 mole) of azelaic acid and 0.95 grams of an organo chromium (III) catalyst sold under the trade designation AMC-2 by Cordova Chemical Co. These reactants are heated to 130°±5° C. under agitation and a nitrogen atmosphere. Propylene oxide in the amount of 116 grams (2.0 moles) is then added dropwise over a period of 5 hours. The reaction is maintained until the acid number is less than 1.0. Any excess propylene oxide is removed by applying a slight vacuum. The product has a Gardner-Holdt bubble viscosity of J at 25° C.

(B) Preparation of Hydroxy Functional Copolymer

A hydroxy functional copolymer is prepared from the following components in the manner hereinafter described:

| Monomers | Amounts, Grams |
| --- | --- |
| Hydroxyethylacrylate | 30 |
| Styrene | 25 |
| Isobutylmethacrylate | 45 |

To an admixture of the above monomers are added 2.5 grams of cumene hydroperoxide and 4.5 grams of t-butyl perbenzoate. This mixture is then added dropwise over a period of 3 hours to 100 grams of xylene heated to 136° C. while stirring vigorously. The reaction vessel is equipped with a cooled condenser to condense the xylene or monomer vapors and return them to the reaction vessel. After the addition of the monomer mixture is completed, the reaction is allowed to continue for another 2 to 3 hours. The resultant copolymer solution is then stripped under vacuum to 72% by weight solids. The Gardner-Holdt viscosity is Z2.

(C) Formulation and Application of Coating Composition

In a mixer 31.5 grams of the above hydroxy functional copolymer is mixed with 10.3 grams of the above prepared oligoester as well as a pigment dispersion containing 7.5 g. of titanium dioxide, 1.0 g. of the acrylic resin solids and 1.9 g. of methylamylketone. To this mixture is added 8.6 grams of methylamylketone to reduce the solids level to approximately 68.1% and 0.03 grams of dibutyldilaurate catalyst are added. This admixture is fed as one component of a two component feed to a spray gun. The other component comprises polyisocyanate crosslinking agent Desmodur N, manufactured by Mobay Chemical Co., or solution of Desmodur N in a nonreactive solvent. This material is a biuret type polyisocyanate.

These two components are mixed and spray applied at 64.83% volume solids such that ratio of reactive isocyanate groups per hydroxyl group in the composition is approximately 1.1 to 1.0. The coating is cured for

EXAMPLE II

A thermosetting high solids paint composition is prepared as in Example I with the exception that the percentages by weight of the acrylic copolymer, the oligoester and the isocyanate crosslinking agent as applied in the coating composition are 35%, 19% and 46% respectively.

EXAMPLE III

A thermosetting high solids paint composition is prepared as in Example I with the exception that the hydroxy functional copolymer of the hydroxy functional component is prepared from 30 parts of hydroxyethylacrylate, 25 parts of styrene, 43 parts of isobutylmethacrylate, and 2 parts of methacrylic acid.

EXAMPLE IV

A thermosetting high solids paint composition is prepared as in Example I with the exception that the percentages by weight of the acrylic copolymer, the oligoester and the isocyanate crosslinking agent as applied are 55%, 6% and 39% respectively.

EXAMPLE V

A thermosetting high solids paint composition is prepared and applied in the same manner as in Example III with the exception that:
(a) oligoester is prepared by reacting 188 grams (1 mole) of azelaic acid, and 127.6 grams (2.2 moles) of propylene oxide in the presence of 0.94 grams of AMC-2 organochrome (III) catalyst from Cordova Chemical Co. to produce an oligoester with a Gardner-Holdt bubble viscosity of I-J, and
(b) toluene diisocyanate is employed as the crosslinking agent in an amount sufficient to provide about 1.3 reactive isocyanate groups per hydroxyl group in the composition.

EXAMPLE VI

A thermosetting high solids paint composition is prepared and applied as in the same manner as in Example III with the exception that:
(a) the oligoester is prepared by reacting 202 grams (1.0 mole) of sebacic acid with 116 grams (2.0 moles) of propylene oxide in the presence of 1.01 grams of AMC-2 organochrome (III) catalyst to produce a product with a Gardner-Holdt bubble viscosity of I-J; and
(b) 1,4 cyclohexane diisocyanate is used as the crosslinking agent in an amount sufficient to provide about 1.1 isocyanate groups per hydroxyl group in the composition.

EXAMPLE VII

A thermosetting high solids paint composition is prepared in the same manner as in Example I with the exception that:
(a) the oligoester is prepared by reacting 570 grams (1 mole) of dimer fatty acid (Epon 1016 from Emery Industries, Inc.) with 116 grams (2.0 moles) of propylene oxide in the presence of 2.85 grams of AMC-2 organochrome (III) catalyst to produce a product with a Gardner-Holdt bubble viscosity of X; and
(b) bis (2-isocyanate ethyl) fumarate is used as the crosslinking agent in an amount sufficient to provide about 1.4 reactive isocyanate groups per hydroxyl group in the composition.

EXAMPLE VIII

A thermosetting high solids paint composition is prepared and applied in the same manner as in Example I with the exception that:
(a) the oligoester is prepared by reacting 188 grams (1.0 mole) azelaic acid and 41.5 grams (0.25 moles) of isophthalic acid with 145 grams (2.5 moles) of propylene oxide in the presence of 1.15 grams of AMC-2 organochrome (III) catalyst to produce a product with a Gardner-Holdt bubble viscosity of R; and
(b) trimerized 1,6 hexamethylene diisocyanate is used as the crosslinking agent in an amount sufficient to provide about 0.75 reactive isocyanate groups per hydroxyl group in the composition.

EXAMPLE IX

A thermosetting high solids paint composition is prepared and applied as in Example I with the exception that:
(a) the oligoester is prepared by reacting 188 grams (1.0 mole) of azelaic acid with 116 grams (2.0 moles) of propylene oxide in the presence of 2.4 grams of tetramethyl ammonium chlorde to produce a product with a Gardner-Holdt bubble viscosity of K; and
(b) 2,2,4 (2,4,4)-trimethylhexamethylene diisocyanate is used as the crosslinking agent in an amount sufficient to provide about 0.5 reactive isocyanate groups per molecule.

EXAMPLE X

A thermosetting high solids paint composition is prepared as in Example I with the exception that:
(a) the oligoester is prepared by charging 360 grams of diglycidyl ether of bisphenol A with an epoxy equivalent weight of 180 (Epon 826 from Shell Chemical Co.) and 1.5 grams of tetraethylammonium bromide into a reaction flask equipped with a stirrer, water condenser, thermometer, nitrogen inlet and a monomer addition funnel. These materials are heated to 130 5° C. under agitation and a nitrogen atmosphere and 120 grams of acetic acid is added thereto dropwise over a period of 2 hours; and
(b) xylene diisocyanate is used as the crosslinking agent in an amount sufficient to provide about 1 reactive isocyanate group per hydroxyl group in the composition.

EXAMPLE XI

A thermosetting, high solids paint composition is prepared as in Example III with the exception that:
(a) the hydroxy functional oligoester is prepared by charging 300 grams of 12-hydroxystearic acid and 1 gram of chromium (III) catalyst AMC-2 from Cordova Chemical Co. into a reaction flask equipped with a stirrer, water condenser, thermometer, nitrogen inlet and a monomer addition funnel, heating to 140°±5° C. under agitation and nitrogen atomsphere, and then adding 65 grams of propylene oxide thereto dropwise over a 3-hour period; and (b) Desmodur N biuret polyisocyanate is used as a crosslinking agent in an amount sufficient to provide about 1.2 isocyanate groups per hydroxyl group in the composition.

EXAMPLE XII

A thermosetting, high solids paint composition is prepared as in Example III with the exception that:
(a) the hydroxy functional oligoester is prepared by
  (i) preparing a trifunctional carboxylic acid by reacting 1 mole (134 grams) of trimethylol propane with 3 moles (444 grams) of phthalic anhydride;
  (ii) adding 1.5 grams of trimethyl-ammonium chloride to the reaction flask containing the trifunctional carboxylic acid and heating the materials to 140°±5° C. under agitation and a nitrogen atmosphere; and
  (iii) adding 3 moles (174 grams) of propylene oxide thereto dropwise over a 4-hour period; and
(b) 2,4 6 triisocyanate toluene is used as the polyisocyanate crosslinking agent in an amount sufficient to provide about 1.1 reactive isocyanate groups per hydroxyl group in the composition.

EXAMPLE XIII

In a mixer twenty-five (25) grams of the hydroxy functional oligoester prepared as in Example I(A), is blended with 100 grams of hydroxy functional acrylic copolymer prepared as in Example I(B), (50% solution in xylene), and 70 grams of Resimene 750 (60% solids in butanol). This mixture is applied to a primed steel substrate using a 3 mil. draw-down bar and baked at 275° F. for 30 minutes to provide a tough, high gloss coating with excellent physical properties.

EXAMPLE XIV

A coating composition is formulated as in Example XIII with the exception that 42 grams of Cymel 301 is used in place of the butylated melamine resin and 0.5 grams of p-toluene sulfonic acid is added. The paint is applied in 3 mil. thickness with a draw-down bar and cured at 275° F. for 30 minutes.

EXAMPLE XV

Under constant agitation 83.5 grams of the hydroxy functional oligoester prepared as above I(A) is blended with (a) 139 grams of a hydroxy functional coplymer prepared as in I(B), but from 30% by weight hydroxyethyl acrylate, 20% by weight styrene, 24% by weight methyl methacrylate, 25% by weight butylmethacrylate and 1% by weight methacrylic acid, (b) 167 grams of Cymel 301, (c) 1 gram of p-toluene sulfonic acid, (d) 30 grams of aluminum pigment dispersion comprising 32.5% aluminum pigment, 17.5% mineral spirits and 50% xylene and (e) 75 grams of cellosolve acetate. The resulting metallic paint composition is then further reduced with xylene to a spray viscosity of about 26 seconds No. 4 Ford Cup. The metallic paint film so obtained is baked for 30 minutes at 275° F. to give a glossy, solvent resistant and flexible coating.

EXAMPLE XVI (A) Preparation of Flow Control Additive

A reaction flask equipped with a stirrer, water condenser, thermometer and monomer addition funnel is charged with 991 grams of heptane, 41 grams methyl methacrylate, 0.7 grams azobisisobutyronitrile and 7 grams of a dispersion stablizer which comprises 23.9% methyl methacrylate, 6.1% glycidyl methacrylate, 25.1% of a poly-12-hydroxystearic acid ester of glycidyl methacrylate, 0.4% of methacrylic acid, 37.3% n-butyl acetate, and 7.2% xylene. The reaction flask is heated to reflux at 92° C. A mixture of 1022 grams of methyl methacrylate, 55 grams of glycidyl methacrylate, 34 grams of methacrylic acid, 3.4 grams of dodecylamine, 147 grams of the above dispersion stabilizer, 7.7 grams of n-octyl mercaptan, 7.7 grams azobisisobutyronitrile, and 427 grams of aliphatic naptha is then added over a period of 4 hours. After an additional hour, 0.77 grams azobisisobutyronitrile and 60 grams n-butyl acetate is added. The reaction mixture is then cooked for an additional two hours. The reaction mixture is cooled and 96 grams of n-butylacetate is added. The resultant acrylic dispersion has a solids content of 43% and a No. 4 Ford cup viscosity of 27 seconds.

(B) Preparation of Paint Composition

To 286 parts of hydroxy functional acrylic copolymer prepared in Example I(B) is added 176 parts of Cymel 325 (a partially alkylated melamine formaldehyde resin made by American Cyanamid), 33 parts of the hydroxy functional oligoester prepared as in Example I(A), 96 parts of flow control additive resin/solvent blend (which comprises 14 parts of the butylated melamine formaldehyde resin solution prepared as hereinbefore described as "B. Preparation of Butylated Melamine Formaldehyde Resin", 21 parts of the flow control additive as prepared above, and 2 parts isopropyl acetate) and 302 parts of TiO$_2$ pigment paste. The pigment paste comprises 219 parts TiO$_2$ pigment, 30 parts of the hydroxy functional acrylic copolymer from I(B), and 53 parts methyl amyl ketone. The above composition is let down with a solvent thinner to a viscosity of 40 seconds measured by a No. 4 Ford cup and further thinned by 6% weight reduction with cellosolve acetate solvent to a viscosity of 30 seconds measured in a No. 4 Ford cup. This weight solids at spray viscosity is 65%. The paint formulation is then sprayed onto a metal panel, flashed for 5 minutes at room temperature and baked at 280° F. at 20 minutes to yield a film having excellent gloss and sag resistance. The dry film thickness of the coating was 2.5 mils.

EXAMPLE XVII

To 155 parts of hydroxy functional acrylic copolymer of Example I(B) are added 93 parts of Cymel 325, 18.6 parts of hydroxy functional oligoester from Example I(A), 67.8 parts of flow control additive resin/solvent blend (which comprises 18.3 parts of the hydroxy functional acrylic copolymer. 14.9 parts of the above flow control additive, and 34.6 parts of methyl ethyl ketone), and 6.3 parts of aluminum pigment. The above composition is let down with a solvent thinner to a viscosity of 33 seconds measured by No. 4 Ford cup and further thinned by 5% weight reduction with cellosolve acetate solvent to a viscosity of 25 seconds measured by No. 4 Ford cup. The composition is sprayed onto a metal panel, flashed for 5 minutes at room temperature and then baked at 280° F. for 20 minutes to cure. The dry film thickness of the coating is 1.8 mils, the 20° gloss meter reading is 70%, and the appearance of the paint is excellent with good aluminum pigment control.

The foregoing examples are intended to be merely illustrative of the invention defined in the appended claims. Those skilled in the art will be aware that modifications may be made therein without departing from the scope of the invention as set forth in the appended claims.

What is claimed is:

1. A high solids, thermosetting coating composition which, exclusive of pigments, solvents and other nonreactive components, consists essentially of:
   (A) A hydroxy functional component consisting of:
      (1) between about 1 and about 90 weight percent of one or more oligoesters
         (i) having a number average molecular weight ($\overline{M}_n$) of between about 150 and about 3000,
         (ii) bearing at least 2 hydroxyl groups per molecule, and
         (iii) being formed by an esterification reaction between a carboxylic acid and an epoxide; and
      (2) between about 99 and about 10 weight percent of a hydroxy functional copolymer having a number average molecular weight ($\overline{M}_n$) of between about 500 and 15,000, said hydroxy functional copolymer being formed from about 10 to about 50 weight percent of hydroxy functional monoethylenically unsaturated monomers selected from the group consisting of hydroxy bearing aliphatic alcohol esters of acrylic and methacrylic acids, and a remainder of other monoethylenically unsaturated monomers; and
   (B) A crosslinking agent capable of reacting with hydroxy functionality of said hydroxyl functional component.

2. A high solids, thermosetting coating composition in accordance with claim 1 wherein said oligoesters are selected from the group consisting of:
   (a) the esterification reaction product of a polycarboxylic acid and a monoepoxide;
   (b) the esterification reaction product of a polyepoxide and a monocarboxylic acid bearing no hydroxy functionality;
   (c) the esterification reaction product of a hydroxy functional carboxylic acid and a monoepoxide;
   (d) the esterification reaction product of a monocarboxylic acid and a hydroxy functional monoepoxide; and
   (e) mixtures of (a)–(d).

3. A high solids, thermosetting coating composition in accordance with claim 1 or 2 wherein said oligoester bears functionality other than hydroxy functionality, which functionality does not interfere with the crosslinking reaction between said hydroxy functionality and said crosslinking agent.

4. A high solids, thermosetting coating composition in accordance with claims 1 or 2 wherein said crosslinking agent is an amino crosslinking agent and is included in said coating composition in an amount equal to the total of (1) between about 40 and about 150 parts by weight per 100 parts by weight of said oligoesters and (2) between about 25 and about 67 parts by weight per 100 parts by weight of said hydroxy functional copolymer.

5. A thermosetting coating composition in accordance with claim 4 wherein said amino crosslinking agent is selected from the group consisting of condensation products of formaldehyde with melamine, substituted melamine, urea, benzoguanamine or substituted benzoguanamine.

6. A thermosetting coating composition in accordance with claim 5 wherein said amino crosslinking agent is monomeric.

7. A thermosetting coating composition in accordance with claim 5 wherein said amino crosslinking agent is an ether of a fully methylated melamine.

8. A high solids, thermosetting coating composition in accordance with claims 1 or 2 wherein said crosslinking agent is a polyisocyanate crosslinking agent having two or more reactive isocyanate groups per molecule and being included in said coating composition in an amount equal to between about 0.5 and about 1.6 reactive isocyanate groups per hydroxyl group present in said composition.

9. A high solids, thermosetting coating composition in accordance with claim 8 wherein said polyisocyanate crosslinking agent is included in said composition in an amount sufficient to provide between about 0.8 and about 1.3 reactive isocyanate groups per hydroxyl group in said composition.

10. A high solids, thermosetting coating composition in accordance with claim 8 wherein said polyisocyanate crosslinking agent is a diisocyanate.

11. A high solids, thermosetting coating composition in accordance with claim 8 wherein said polyisocyanate crosslinking agent has 3 or more reactive isocyanates per molecule.

12. A high solids, thermosetting coating composition in accordance with claim 11 wherein said polyisocyanate crosslinking agent is a trimerized product of an aliphatic diisocyanate.

13. A high solids, thermosetting coating composition in accordance with claim 11 wherein said polyisocyanate crosslinking agent is a trimerized reaction product of 1,6 hexamethylene diisocyanate.

14. A high solids, thermosetting coating composition in accordance with claim 11 wherein said polyisocyanate crosslinking agent is a polyisocyanate having a biuret structure.

15. A high solids, thermosetting coating composition in accordance with claim 1 wherein said hydroxy functional oligoester is an esterification reaction product of an aliphatic dicarboxylic acid containing 6 to 12 carbon atoms and an alkylene oxide.

16. A high solids, thermosetting coating composition in accordance with claim 1 wherein said hydroxy functional oligoester is an esterification reaction product of an alkylene oxide and a polycarboxylic acid.

17. A high solids, thermosetting coating composition in accordance with claim 1 wherein said hydroxy functional oligoester is an esterification reaction product of one or more aliphatic monocarboxylic acids containing between about 1 and about 22 carbon atoms and a diepoxide.

18. A high solids, thermosetting coating composition in accordance with claim 1 wherein said hydroxy functional oligoester is an esterification reaction product of a hydroxy functional aliphatic monocarboxylic acid having between about 2 and 22 carbon atoms and a polyepoxide.

19. A high solids, thermosetting coating composition in accordance with claim 1 wherein said hydroxy functional oligoester is an esterification reaction product of an aliphatic carboxylic acid containing between 2 and 22 carbon atoms and an alkylene oxide.

20. A high solids, thermosetting coating composition in accordance with claims 1 or 2 wherein said hydroxy functional copolymer has a number average molecular weight ($\overline{M}_n$) of between about 1500 and about 5000 and is prepared from between about 25 and 40 weight percent of hydroxy functional monoethylenically unsaturated monomers selected from the group consisting of hydroxy bearing aliphatic alcohol esters of acrylic and methacrylic acid, and a remainder of other monoethylenically unsaturated monomers.

21. A high solids, thermosetting coating composition in accordance with claim 20 wherein said remainder of other monoethylenically unsaturated monomers are monomers bearing alpha-beta olefinic unsaturation.

22. A high solids, thermosetting coating composition in accordance with claim 21 wherein said other monoethylenically unsaturated monomers are selected from the group consisting of acrylates, methacrylates, monovinyl hydrocarbons having between 8 and 12 carbon atoms, other modifying vinyl monomers and mixtures thereof.

23. A high solids, thermosetting coating composition in accordance with claim 20 wherein said other monoethylenically unsaturated monomers consist essentially of esters of $C_1$-$C_8$ monoalcohols and acrylic or methacrylic acids.

24. A high solids, thermosetting coating composition in accordance with claim 1 wherein said hydroxy functional component consists of:
(1) between about 5 and about 30 weight percent of hydroxyl bearing oligoester having a number average molecular weight ($\overline{M}_n$) of between about 150 and about 3000 and being selected from the group consisting of:
(a) the esterification reaction product of a di- or polycarboxylic acid and a monoepoxide;
(b) the esterification reaction product of a polyepoxide with a monocarboxylic acid;
(c) the esterification reaction product of a hydroxy functional carboxylic acid with a mono- or polyepoxide;
(d) the esterification reaction product of a monocarboxylic acid and a hydroxy functional mono- or diepoxide; and
(e) a mixture of the esterification reaction products of (a)-(d); and
(2) between about 95 and about 70 weight percent of a hydroxy functional copolymer having a number average molecular weight ($\overline{M}_n$) of between about 500 and 15,000 said hydroxy functional copolymer being formed from about 10 to about 50 weight percent of hydroxy functional monoethylenically unsaturated monomers selected from the group consisting of hydroxy bearing aliphatic alcohol esters of acrylic and methacrylic acid, and a remainder of other monoethylenically unsaturated monomers.

25. A high solids, thermosetting coating composition in accordance with claim 24 wherein said crosslinking agent is an amino crosslinking agent and is included in said coating composition in an amount equal to the total of (1) between about 40 and about 150 parts by weight per 100 parts by weight of said oligoesters and (2) between about 25 and about 67 parts by weight per 100 parts by weight of said hydroxy functional copolymer.

26. A high solids, thermosetting coating composition in accordance with claim 24 wherein said crosslinking agent is a polyisocyanate crosslinking agent having two or more reactive isocyanate groups per molecule and being included in said coating composition in an amount sufficient to provide between about 0.5 and about 1.6 reactive isocyanate groups per hydroxyl group present in said composition.

27. A high solids, thermosetting coating composition in accordance with claim 26 wherein
(A) said hydroxy functional component consists of:
(1) between about 10 and about 50 weight percent of said hydroxy functional oligoester; and
(2) between about 90 and about 50 weight percent of said hydroxy functional copolymer; and
(B) said crosslinking agent
(1) has 3 or more reactive isocyanate groups per molecule;
(2) has a biuret structure; and
(3) is included in said composition in an amount sufficient to provide between about 0.8 and about 1.3 reactive isocyanate groups per hydroxyl group in said hydroxy functional component.

28. A thermosetting coating composition in accordance with claim 24 wherein said hydroxy functional copolymer has a number average molecular weight ($\overline{M}_n$) of between about 1500 and about 5000 and is prepared from between about 25 and about 40 weight percent of an hydroxy functional monoethylenically unsaturated monomer selected from the group consisting of hydroxy bearing aliphatic alcohol esters of acrylic and methacrylic acid, and a remainder of other monoethylenically unsaturated monomers.

29. A thermosetting coating composition in accordance with claim 28 wherein said remainder of other monoethylenically unsaturated monomers are monomers bearing alpha-beta olefinic unsaturation.

30. A thermosetting coating composition in accordance with claim 28 wherein said other monoethylenically unsaturated monomers are selected from the group consisting of acrylates, methacrylates, monovinyl hydrocarbons having between 8 and 12 carbon atoms, other modifying vinyl monomers and mixtures thereof.

31. A high solids, thermosetting coating composition which, exclusive of pigments, solvents and other nonreactive components, consist essentially of:
(A) a hydroxy functional component consisting of:
(1) between about 10 and about 90 weight percent of hydroxyl bearing oligoester having a number average molecular weight ($\overline{M}_n$) of between about 150 and about 3000 and being selected from the group consisting of:
(a) the esterification reaction product of a di- or polycarboxylic acid and a monoepoxide;
(b) the esterification reaction product of a polyepoxide with a monocarboxylic acid;
(c) the esterification reaction product of a hydroxy functional carboxylic acid with a mono- or polyepoxide; and
(d) the esterification reaction product of a monocarboxylic acid and a hydroxy functional mono- or polyepoxide and
(e) a mixture of the esterification reaction product of (a)-(d); and
(2) between about 90 and about 10 weight percent of a hydroxy functional copolymer having a number average molecular weight ($\overline{M}_n$) of between about 500 and about 15,000, said hydroxy functional monoethylenically unsaturated monomers selected from the group consisting of hydroxy bearing aliphatic alcohol esters of acrylic and methacrylic acid, and a remainder of other monoethylenically unsaturated monomers; and (B) a polyisocyanate crosslinking agent having 2 or more reactive isocyanate groups per molecule, said polyisocyanate crosslinking agent being included in said coating composition in an amount sufficient to provide between about 0.5 and about 1.6 reactive isocyanate groups per hydroxy functional group in said composition.

32. A thermosetting coating composition in accordance with claim 30 wherein said polyisocyanate crosslinking agent is included in said composition in an amount sufficient to provide between about 0.8 and about 1.3 reactive isocyanate groups per hydroxy group in said composition.

33. A thermosetting coating composition in accordance with claim 30 wherein said polyisocyanate crosslinking agent is a diisocyanate.

34. A thermosetting coating composition in accordance with claim 30 wherein said polyisocyanate crosslinking agent has 3 or more reactive isocyanates per molecule.

35. A thermosetting coating composition in accordance with claim 34 wherein said polyisocyanate crosslinking agent is a trimerized product of an aliphatic diisocyanate.

36. A thermosetting coating composition in accordance with claim 35 wherein said polyisocyanate crosslinking agent is a trimerized reaction product of 1,6 hexamethylene diisocyanate.

37. A thermosetting coating composition in accordance with claim 34 wherein said polyisocyanate crosslinking agent is a polyisocyanate having a biuret structure.

38. A thermosetting coating composition in accordance with claim 30 wherein said hydroxy functional oligoester is an esterification reaction product of an alkylene oxide and an aliphatic dicarboxylic acid containing 6 to 12 carbon atoms.

39. A thermosetting coating composition in accordance with claim 30 wherein said hydroxy functional oligoester is an esterification reaction product of an alkylene oxide and a polycarboxylic acid.

40. A thermosetting coating composition in accordance with claim 30 wherein said hydroxy functional oligoester is an esterification reaction product of a diepoxide and one or more aliphatic monocarboxylic acids containing between about 1 and about 22 carbon atoms.

41. A thermosetting coating composition in accordance with claim 30 wherein said hydroxy functional oligoester is an esterification reaction product of a hydroxy functional aliphatic monocarboxylic acid having between about 2 and 22 carbon atoms and a polyepoxide.

42. A thermosetting coating composition in accordance with claim 30 wherein said hydroxy functional oligoester is an esterification reaction product of a hydroxy functional aliphatic carboxylic acid containing between about 2 and 22 carbon atoms and an alkylene oxide.

43. A thermosetting coating composition which, exclusive of pigments, solvents and other nonreactive components consists essentially of:
(A) A hydroxy functional component consisting of:
 (1) between about 10 and about 50 weight percent of a hydroxy bearing oligoester having a number average molecular weight ($\overline{M}_n$) of between about 150 and about 3000, said hydroxy bearing oligoester being the esterification reaction product of a aliphatic dicarboxylic acid having between about 6 and 12 carbon atoms and an alkylene oxide; and
 (2) between about 90 and about 50 weight percent of a hydroxy functional copolymer formed from between about 25 and about 40 weight percent of a hydroxy functional monoethylenically unsaturated monomer selected from the group consisting of hydroxy bearing aliphatic alcohol esters of acrylic and methacrylic acid, and a remainder of other monoethylenically unsaturated monomers bearing alpha-beta olefinic unsaturation, said other monoethylenically unsaturated monomers being selected from the group consisting of acrylates, methacrylates, monovinyl hydrocarbons having 8–12 carbons, other modifying monomers and mixtures thereof; and
(B) a polyisocyanate crosslinking agent having 3 or more reactive isocyanate groups per molecule, said isocyanate crosslinking agent having a biuret structure and being included in said composition in an amount sufficient to provide between about 0.8 and about 1.3 reactive isocyanate groups per hydroxy group of said hydroxy functional component.

* * * * *